Patented May 9, 1950

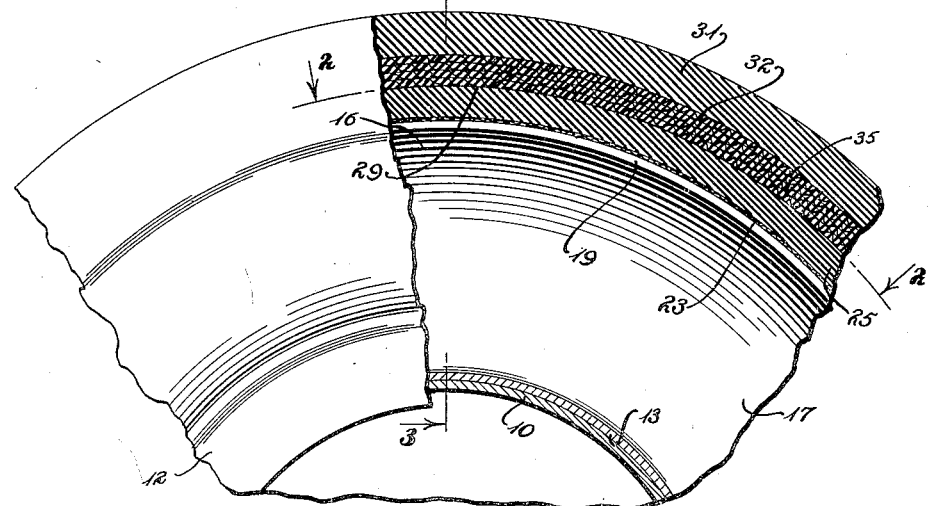
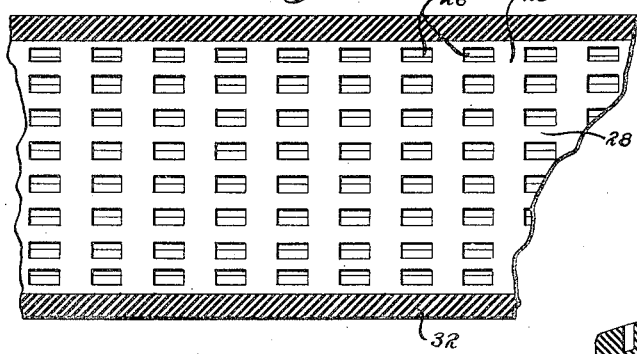
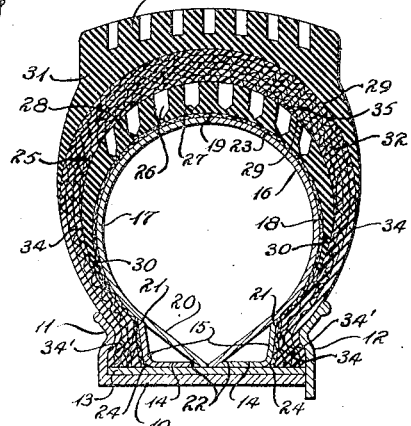
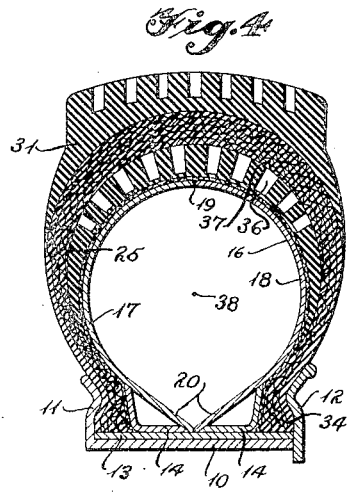
INVENTOR.
Harry E. Drennan

2,506,861

UNITED STATES PATENT OFFICE 2,506,861

CUSHION TIRE

Harry E. Drennan, El Dorado, Ark.

Application November 28, 1947, Serial No. 788,610

7 Claims. (Cl. 152—249)

The present invention relates to improvements in the construction of cushion tires for motor vehicles and the like.

An important object is to provide a cushion tire as distinguished from a pneumatic tire, with a hollow resilient core, and interposing between the core and the inner wall of the tire casing, a resilient member having openings or pockets, and utilizing the solid portions of the resilient member between the pockets to provide yieldable upwardly projecting spaced columns or pillars circumferentially disposed around the core, and engaging the inner wall of the tire so as to provide resilient spaced supporting means for transmitting the pressure of the tire casing to the core, and for absorbing the shock or vibrations to which the tire is subjected when moving over the ground. The tire casing is built up around the resilient member and the core and firmly secured or united thereto, to provide a unitary cushion tire assembly.

Other objects and advantages of the invention will become apparent from the following description when taken in conjunction with the accompanying claims and drawings.

Referring to the drawings wherein are shown several preferred embodiments the invention may assume:

Figure 1 is a detail side elevational view of a cushion tire constructed in accordance with the present invention and with parts in section for purpose of illustration.

Figure 2 is a sectional view taken substantially along the line 2—2 of Figure 1.

Figure 3 is a sectional view taken substantially along the line 3—3 of Figure 1, and Figure 4 is a view similar to Figure 3 showing a modified form of the cushion tire.

Referring to the drawings wherein like numerals indicate like parts in the several views, 10 designates the rim of a motor vehicle wheel or the like, which is provided with the usual fixed flange 11 and the removable flange 12 (Fig. 3) that is detachably connected to the rim by any suitable means not shown. An annular metal thin, removable, flat plate 13 is carried by the rim 10 between the flanges 11 and 12. Suitably secured to the outer periphery of the plate 13 such as by welding or the like, are a pair of circumferentially disposed metal reinforcing members 14 which are provided with outwardly projecting arms 15 that are spaced from the flanges 11 and 12 respectively. A hollow flexible core member 16 preferably fashioned from light, durable metal such as thin steel or aluminum, is arranged to be firmly connected to the plate 10. The core member 16 manifestly may be made of other materials such as plastic having a high softening temperature or hard vulcanizing rubber reinforced with fabric or metal wire cloth or strips. The core member 16 is preferably formed of two curved flexible opposed sections 17 and 18 which are centrally welded as at 19 and initially are bent inwardly so that their ends 20 assume the position as shown in Figure 3, and are welded as at 21 to the upper ends of the arms 15 and at 22 to the members 14 and the plate 13. The outer periphery of the core 16 when initially attached to the supporting member 14 is substantially of transverse oval shape and is preferably covered by a thin sheet or strip of rubber or rubberized fabric 23 that is secured at its ends as at 24, to the reinforcing members 14. A resilient supporting member 25 preferably formed of high grade elastic rubber or rubber-like material, is secured by any suitable means to the strip or sheet 23 carried by the core 16 and is shaped to conform with the configuration of the core. Formed in the outer surface of the member 25 and extending inwardly thereof a limited distance, are a series of spaced openings or air pockets 26 which may be of any suitable shape and are shown of rectangular formation having tapered bottom portions 27 and terminating short of the inner wall of the member 25. The pockets or recesses 26 are circumferentially disposed to form the member 25 with spaced resilient solid supporting portions or columns 28 extending between the pockets 26 and around the core 16. A thin sheet or strip of rubber or rubberized fabric 29 preferably covers the outer surface of the resilient supporting member 25 and is firmly secured at its opposite ends as at 30 at the adjacent portion of the strip 23 by any suitable adhesive or heating means. A tire casing 31 is then built up around the resilient member 25 and the core 16 in any suitable manner, such as by inserting the parts of the rubber tire including layers of fabric 32 in a vulcanizing or heating mold so as to form the tire casing with the treads 33 and the side walls 34 which terminate in enlarged or thick beaded ends 34'. The beaded ends 34' are vulcanized or otherwise firmly secured to the plate 13 during the formation of the tire casing and at the same time the resilient rubber member 25 is firmly connected to the fabric sheet 29 or directly to the inner wall of the casing, if the covering sheet 29 is omitted. After the complete or unitary cushion tire is formed on the plate 13, it may bodily be connected to the rim 10 of the wall and clamped thereon so as to assume the position as shown in Figure 3.

In assembling the tire, the reinforcing members 14 are first welded or otherwise connected to the plate 13, before the plate is mounted on the rim 10, and the metal resilient hollow core 16 is then shaped and bent so that its end portions 20 may be welded or otherwise secured to the arms 15 of the reinforcing members 14 and to the plate 13. The core 16 then may be covered with the rubberized fabric sheet 23 which is firmly secured at its ends to the arms 15. The resilient rubber or cushion supporting member 25 having the spaced pockets 26 and pillars 28, is then firmly secured to the rubberized sheet 23, or if desired the sheet 23 may be omitted and the inner wall of the member 25 firmly secured or vulcanized to the outer surface of the core 16 by any suitable means. The rubberized fabric sheet 29 may then be applied to cover the pockets 26 and pillars 28 of the resilient supporting member 25 so as to maintain these parts in proper position relative to the core 16. The tire 31 is then built up around the assembled parts so that the inner wall of the tire will be firmly secured to the strip 29 and constitute with the core 16 and the yieldable supporting member 25, a unitary cushion tire which then may be attached to the rim 10 and secured thereto by the clamping flanges 11 and 12.

The resilient portions or columns 28 (Fig. 2) between the air pockets or recesses 26 in the member 25, may be of any suitable configuration and the space between the pockets may be varied to give the desired resiliency to the tire. The resilient portions 28 are of sufficient dimensions as to provide a contacting surface which engages and conforms in shape to the inner wall 35 of the tire casing so as to provide spaced resilient supporting means between the pockets 26 for absorbing the shock and the pressure transmitted to the tire when traveling over either an even or uneven road surface. The flexible rubberized fabric strip 23 is positioned between the core and the inner surface of the supporting member 25 to facilitate the attaching of the resilient supporting member 25 to the metal core. In other words, the connecting of the rubber supporting member 25 to the fabric strip 23 instead of direct to the metal surface of the core 16, insures a firmer and more secure connection than could be effected by a fabric or non-metallic connection direct with the metal core. The pockets or recesses 26 extend longitudinally and circumferentially around the core member 16 and are disposed substantially radial to the center of the wheel or hub axis. These pockets also provide spaces between the columns 28 into which the latter expand when subjected to inward pressure. The outer surface of the core member 16 may be roughened by grinding or provided with minute indentations in order to aid in maintaining in place the rubberized fabric sheet 23. The rubberized fabric sheet 23 serves to facilitate the attaching of the resilient supporting member 25 to the core member 16, while the rubberized fabric sheet 29 which covers the air pockets 26 and resilient columns 28 in the supporting member 25, insures the supporting member and its associated parts being firmly maintained in proper position on the wheel rim 10. After the resilient rubber support 25 is mounted within the tire casing 31, it is changed from its initial transverse oval shape to substantially circular or round configuration so as to conform with the curvature of the tire casing.

In the modified form of the invention shown in Figure 4, the parts of the cushion tire are assembled and constructed similar to the forms previously described with the exception that the rubber supporting member 25 is provided with spaced air pockets or recesses 36 which separate the outer surface of the supporting member, into spaced resilient portions or columns 37 that engage the inner wall of the tire casing 31. The pockets 36 are preferably disposed to extend substantially in radial alignment with the center 38 of the hollow resilient core member 16 instead of being substantially radially disposed relative to the center of the wheel axis, and otherwise functions to provide means for efficiently absorbing the shock and vibrations to which the wheel is subjected when traveling over a road surface.

Thus it will be seen that the metal hollow core 16 and the resilient rubber supporting member 25 interposed between the core and the inner wall of the tire casing, coact to provide yieldable means associated with a cushion tire for absorbing the shock and vibrations to which a tire of this character is normally subjected and which is capable of withstanding the stresses and compression force the tire receives when passing over a road surface. Moreover, due to the spaced engagement of the resilient rubber portions 28, with the inner wall of the tire, and the hollow core 16 positioned so as to support the member 25, means are provided for eliminating any tendency of the cushion tire to side roll. Additionally, the tread 33 of the tire is maintained in proper traction engagement with the ground and is less liable to wear unevenly. The cushion tire also functions to transmit the driving torque to the wheel while the elastic supporting portions 28 will insure adequate resiliency and efficient means for absorbing the shock and vibrations imparted to the tire. The resilient support 25 positioned between the core and the tire casing prevents erosion due to rapid compression and friction developed between the supporting member 25 and the casing, and transmits the direct stresses to the wheel in lines that are substantially perpendicular to the supporting surfaces. Moreover, all side thrusts to the unitary tire assembly are imparted along lines normally vertical to the bearing surface of the tire, thus eliminating lateral shearing effects on the resilient supporting portions 28 and the metal core 16. The metal core 16 also functions to conduct away the heat which is generated by the rapid compression within the tire to which the casing and resilient support 25 are subjected.

It will be understood that the forms of the invention shown are merely illustrative of preferred embodiments, and that such changes may be made as fall within the purview of one skilled in the art without departing from the spirit of the invention and the scope of the following claims.

I claim:

1. A cushion tire including an annular plate, spaced reinforcing members secured to the outer circumferential surface of said plate and having outwardly extending arms, a hollow resilient core mounted on the rim and secured to said arms, a resilient rubber member on said core and having its outer surface provided with spaced circumferentially disposed pockets extending inwardly thereof, the portions of said rubber member between said pockets forming resilient spaced columns, the radially inner ends of said pockets being arranged around the top and sides of the core radially outwardly thereof, and a tire casing enclosing said rubber member and secured to said plate, said columns being in engagement with the inner wall of the tire casing for transmitting the pressure of the tire casing to the core.

2. A cushion tire including an annular plate arranged to be detachably connected to the rim of a vehicle wheel, a hollow sectional core mounted on the rim, and having the sections thereof centrally connected together, a rubber supporting member enclosing said core and having its outer surface provided with spaced circumferentially disposed pockets, the portions of said rubber member between said pockets providing spaced resilient columns, said pockets extending substantially radially of the center of the wheel, the radially inner ends of said pockets being arranged around the top and sides of the core radially outwardly thereof, and a tire casing enveloping said rubber member and secured at its ends to said plate, the spaced columns of the rubber member yieldably engaging the inner wall of the tire casing and coacting with said hollow core for absorbing the pressure transmitted to the tire casing.

3. A cushion tire including an annular plate, a hollow sectional core mounted on the rim, and having the sections thereof centrally welded together, a rubber supporting member enclosing said core and having its outer surface provided with spaced circumferentially disposed pockets, the portions of said rubber member between said pockets providing spaced resilient columns, said pockets extending substantially radially of the center of the core, the radially inner ends of said pockets being arranged around the top and sides of the core radially outwardly thereof, and a tire casing enveloping said rubber member and secured to said plate, the spaced columns of the rubber member yieldably engaging the inner wall of the tire casing and coacting with said hollow core for absorbing the pressure transmitted to the tire casing.

4. A cushion tire including an annular plate arranged to be removably mounted on the rim of a vehicle wheel, a hollow metal core mounted on the plate, a rubberized fabric sheet covering the core and secured to the plate, a resilient rubber member secured to said sheet and enclosing said core, said rubber member being provided with circumferentially disposed pockets extending inwardly from the outer surface thereof, the portions of said rubber member between said pockets providing spaced resilient columns, and a tire casing enveloping said resilient rubber member and secured to said plate, said fabric sheet providing means for facilitating the securing of the rubber member to the core, and said columns yieldably engaging the inner wall of the tire casing for transmitting the pressure of the tire casing to the core.

5. A cushion tire including an annular plate, a hollow metal core mounted on the plate, a rubberized fabric sheet covering the core and secured to the plate, a resilient rubber member secured to said sheet and enclosing said core, said rubber member being provided with circumferentially disposed pockets extending inwardly from the outer surface thereof, the portions of said rubber member between said pockets providing spaced resilient columns, and a tire casing enveloping said resilient rubber member and secured to said rim, said fabric sheet providing means for facilitating the securing of the rubber member to the core, a rubberized fabric strip covering said support and secured to the sides of the core, and said columns yieldably engaging the inner wall of the tire casing for transmitting the pressure of the tire casing to the core.

6. In combination with a vehicle wheel, a cushion tire including an annular plate arranged to be removably mounted on the rim of the wheel, spaced reinforcing means secured to the plate, a hollow resilient core connected to said reinforcing means, a resilient rubber member enclosed in said core, said rubber member having circumferentially disposed spaced pockets extending inwardly from the outer surface thereof, the portions of said rubber member between said pockets providing spaced resilient columns, a tire casing enveloping said rubber member, and means clamping the casing to the rim of the wheel, said columns yieldably engaging the inner wall of the tire casing for transmitting the pressure of the tire to the core, the parts being firmly connected to provide a unitary cushion tire assembly.

7. In combination with a vehicle wheel, a cushion tire including an annular plate arranged to be removably mounted on the rim of the wheel, spaced reinforcing members secured to the outer periphery of the plate and having outwardly extending arms, a hollow resilient metal core secured at its ends to the plate and at its opposite sides to the arms on the reinforcing member, a rubberized fabric sheet covering the core and secured at its ends to said plate, a resilient rubber member enclosing said core and secured to said sheet, said rubber member having circumferentially disposed spaced pockets extending inwardly from the outer surface thereof, the portions of said rubber member between said pockets providing spaced resilient columns, a rubberized fabric sheet covering said rubber member, and a tire casing enveloping said rubber member and secured to said last mentioned sheet, said columns yieldably engaging the inner wall of a tire casing for transmitting the pressure of the tire casing to the core, the parts being firmly connected to provide a unitary cushion tire assembly.

HARRY E. DRENNAN.

REFERENCES CITED

The following references are of record in the file of this patent:

UNITED STATES PATENTS

| Number | Name | Date |
|---|---|---|
| 580,884 | Murphy | Apr. 20, 1897 |
| 1,058,151 | Cebolt | Apr. 8, 1913 |
| 1,083,798 | Butts | Jan. 6, 1914 |
| 1,366,849 | Tittle | Jan. 25, 1921 |
| 1,751,741 | Karbowski | Mar. 25, 1930 |

FOREIGN PATENTS

| Number | Country | Date |
|---|---|---|
| 12,541 | Great Britain | May 23, 1910 |
| 766,232 | France | Apr. 9, 1934 |